(12) United States Patent
Chen et al.

(10) Patent No.: US 9,411,840 B2
(45) Date of Patent: Aug. 9, 2016

(54) SCALABLE DATA STRUCTURES

(71) Applicant: Facebook, Inc., Menlo Park, CA (US)

(72) Inventors: Wei Chen, Los Altos Hills, CA (US);
Dhrubajyoti Borthakur, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 246 days.

(21) Appl. No.: 14/249,610

(22) Filed: Apr. 10, 2014

(65) Prior Publication Data

US 2015/0293958 A1 Oct. 15, 2015

(51) Int. Cl.
*G06F 17/30* (2006.01)

(52) U.S. Cl.
CPC ................................ *G06F 17/30327* (2013.01)

(58) Field of Classification Search
CPC ................................................ G06F 17/30327
See application file for complete search history.

(56) References Cited

U.S. PATENT DOCUMENTS

| | | | | |
|---|---|---|---|---|
| 5,218,696 A * | 6/1993 | Baird | ................ | G06F 17/30091 |
| 5,515,531 A * | 5/1996 | Fujiwara | ........... | G06F 17/30433 |
| 5,826,253 A * | 10/1998 | Bredenberg | ........ | G06F 12/0815 |
| 5,852,822 A * | 12/1998 | Srinivasan | ........ | G06F 17/30327 |
| 7,499,912 B2 * | 3/2009 | Hershkovich | ..... | G06F 17/30327 |
| 8,255,398 B2 * | 8/2012 | Bhattacharjee | ... | G06F 17/30631 |
| | | | | 707/736 |
| 2002/0131432 A1 * | 9/2002 | Bachmutsky | ....... | H04L 45/7453 |
| | | | | 370/408 |
| 2006/0020603 A1 * | 1/2006 | Lo Turco | .......... | G06F 17/30734 |
| 2006/0206513 A1 * | 9/2006 | Belyavsky | ........ | G06F 17/30625 |
| 2008/0243770 A1 * | 10/2008 | Aasman | ............ | G06F 17/30587 |
| 2010/0082545 A1 * | 4/2010 | Bhattacharjee | ......... | H03M 7/30 |
| | | | | 707/641 |
| 2013/0226885 A1 * | 8/2013 | Ottaviano | ......... | G06F 17/30961 |
| | | | | 707/693 |
| 2013/0232156 A1 * | 9/2013 | Dunn | ................ | G06F 17/30899 |
| | | | | 707/752 |
| 2014/0280638 A1 * | 9/2014 | O'Dell | .................... | H04L 51/12 |
| | | | | 709/206 |
| 2015/0186453 A1 * | 7/2015 | Agarwal | ........... | G06F 17/30336 |
| | | | | 707/781 |

* cited by examiner

*Primary Examiner* — James Trujillo
*Assistant Examiner* — Hubert Cheung
(74) *Attorney, Agent, or Firm* — Perkins Coie LLP

(57) ABSTRACT

The technology is directed to providing sequential access to data using scalable data structures. In some embodiments, the scalable data structures include a first data structure, e.g., hash map, and a second data structure, e.g., tree data structure ("tree"). The technology receives multiple key-value pairs representing data associated with an application. A key includes a prefix and a suffix. While the suffixes of the keys are distinct, some of the keys can have the same prefix. The technology stores the keys having the same prefix in a tree, and stores the root node of the tree in the first data structure. To retrieve values of a set of input keys with a given prefix, the technology retrieves a root node of a tree corresponding to the given prefix from the first data structure using the given prefix, and traverses the tree to obtain the values in a sequence.

19 Claims, 8 Drawing Sheets

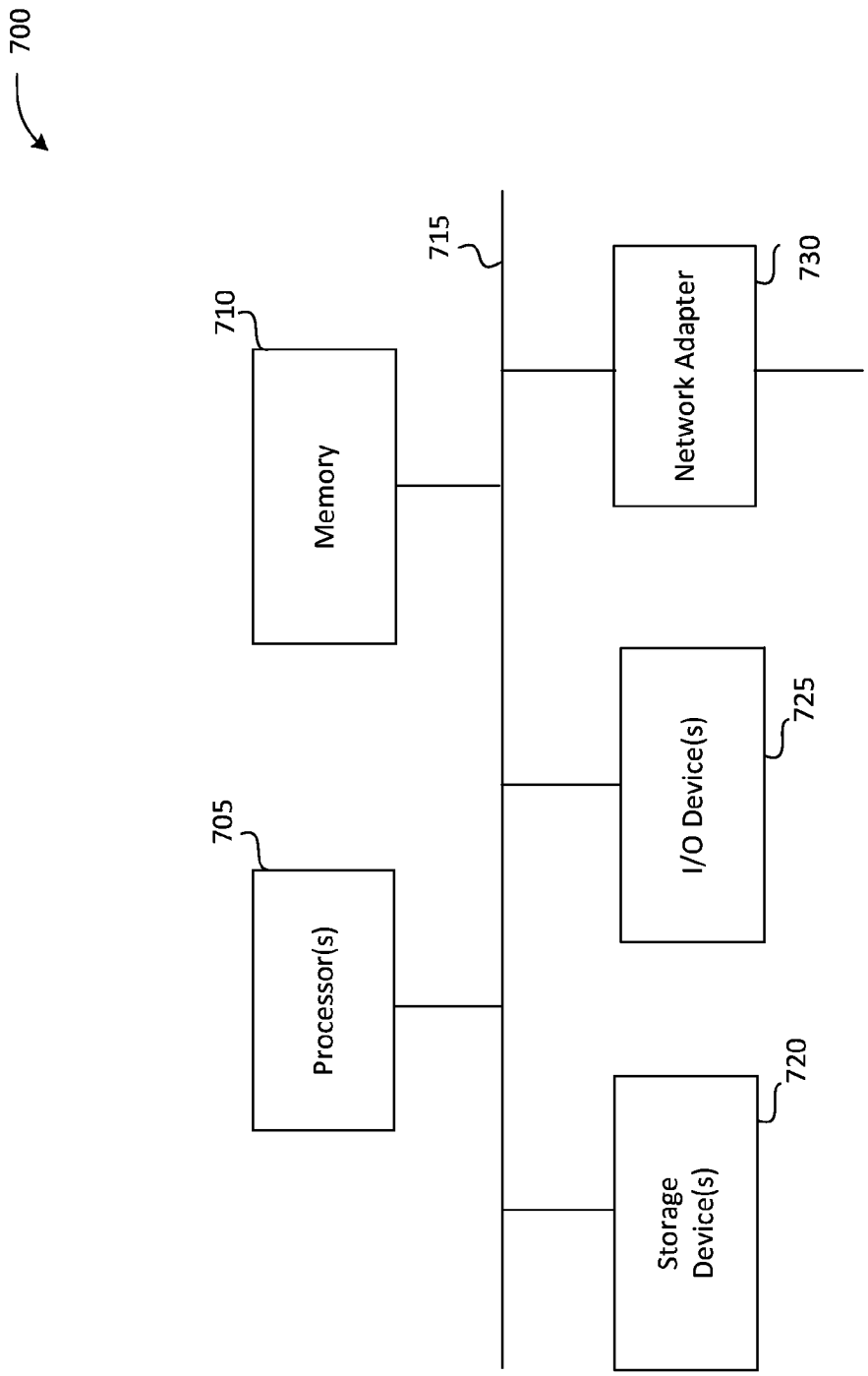

SCALABLE DATA STRUCTURES

BACKGROUND

Software applications ("applications") use various data structures for accessing data associated with an application. For example, applications use a data structure such as a hash table or a hash map for storing key-value pairs. The hash table (or the hash map) is a data structure that is used to implement an associative array, which is a data structure that can map keys to values. A hash table uses a hash function to compute an index into an array of buckets or entries, from which the correct value can be found. The hash table facilitates a "point lookup," e.g., to retrieve a value for a requested key. However, the hash table does not facilitate retrieving the keys (and therefore, their corresponding values) in a specific order. The software application may have to include additional logic for arranging the keys in a particular order after the keys are retrieved from the hash table. Rearranging the keys can consume significant computing resources, especially as the number of key-value pairs stored in the hash table increases, or if the keys are requested in a particular order often, and can therefore, degrade the performance of the application. Accordingly, scaling a hash map to store the entire key-value pairs of the application can adversely affect the performance of the application.

Some applications use a tree data structure ("tree"), e.g., a "B-tree" instead of the hash map to provide sequential access to data. The B-tree inserts into and/or retrieves keys from the tree in a defined sequence. While the B-tree facilitates sequential access to the data, the cost (e.g., processing time, memory access, or other computing resource) involved in inserting a key into the tree increases significantly as the number of keys increase. Inserting a new key into the B-tree can cause the tree to rearrange the nodes of the tree by moving the keys to different nodes to write the new key into the tree. As the tree size increases, e.g., number of keys stored in the tree increases, retrieval of a key consumes more time because software applications may have to traverse a significant number of nodes, perform a number of comparisons to determine the right path to traverse, etc. Accordingly, scaling a B-tree to store the entire key-value pairs of the application can adversely affect the performance of the application.

A log structure merge tree ("LSM tree") is a data structure that is employed in applications that require indexed access to data with high throughput. LSM trees typically have an in-memory portion and an on-disk portion. The in-memory portion typically does not perform efficiently as the amount of available memory increases. Moreover, use of LSM on newer data storage devices, e.g., solid state disks places additional demands on memory, e.g., to reduce storage "write amplification."

BRIEF DESCRIPTION OF THE DRAWINGS

FIG. 7 is a block diagram of a computer system as may be used to implement features of some embodiments.

DETAILED DESCRIPTION

Figure 1:
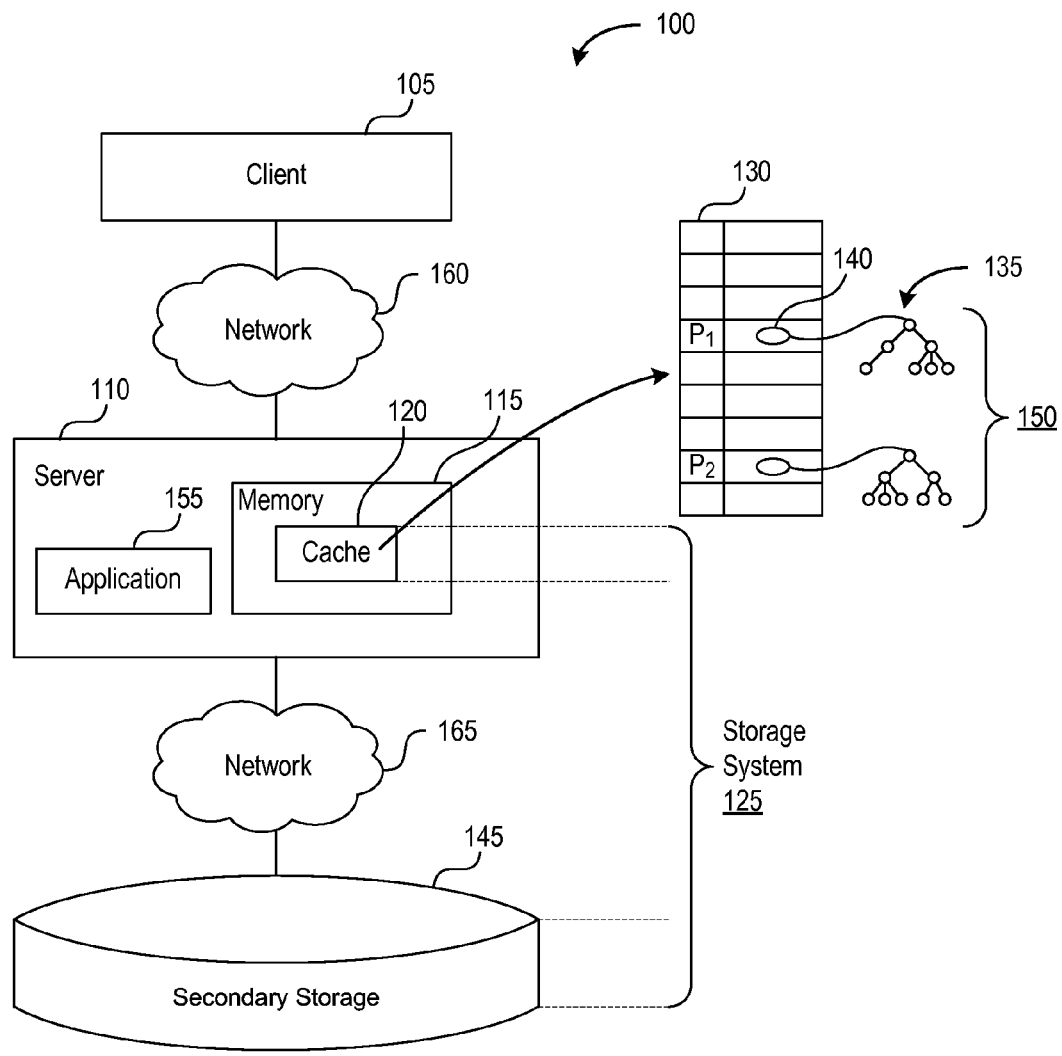
FIG. 1 is a block diagram illustrating an environment in which the scalable data structures can be implemented for providing sequential access to data.

Technology is disclosed for providing sequential access to data using scalable data structures ("the technology"). In some embodiments, the scalable data structures include a combination of a tree data structure, e.g., a B-tree, and an associative array data structure, e.g., hash map. The scalable data structures can store the data in the form of key-value pairs and provide sequential access to the key-value pairs based on the order of the keys. An application, e.g., a social networking application, can store a large set of key-value pairs. However, the application often requests sequential access to a subset of the key-value pairs rather than the entire key-value pairs. For example, while the social networking application contains data of multiple users of the social networking application, it requests sequential access to a set of data associated with a particular user more often than it requests sequential access to data of all the users. The technology can store the subset of the key-value pairs, e.g., keys that have a higher degree of relationship/associativity with each other, in a tree data structure for providing sequential access to the data within the subset.

In some embodiments, the keys of a particular subset, that is, the keys that have a higher degree of relationship/associativity with each other can have a portion of the key, e.g., a prefix of the key, that is same across the keys. The technology stores keys (and their corresponding values) with the same prefix in a particular tree data structure. That is, a subset of the keys with a first prefix is stored in a tree data structure and another subset of keys with a second prefix is stored in another tree data structure. For example, in the social networking application, the keys of key-value pairs of a first user can have a first prefix, e.g., user identification (ID) of the first user, and the keys of key-value pairs of a second user can have a second prefix, e.g., user ID of the second user. The key-value pairs of the first user are stored in a first tree data structure corresponding to the first prefix and the key-value pairs of the second user are stored in a second tree data structure corresponding to the second prefix.

While the technology stores different subsets of the key-value pairs, e.g., keys with different prefixes, in different tree data structures, it indexes the different tree data structures based on the prefixes to which the tree data structures correspond to facilitate access to particular subset of the keys. For example, the technology stores the root nodes of the tree data structures in a hash map. The technology can use the prefix of a key of a key-value pair as a hash key to index the root node of the tree data structure that corresponds to the prefix. While the hash map facilitates as a lookup service to find a tree data structure that stores a subset of the keys with a particular prefix, the tree data structure facilitates a sequential access of the key-value pairs within the subset.

While the combination of the data structures provide sequential access to the data, it is also scalable. That is, the data structures can be configured to manage larger amount of data, e.g., to decrease the write amplification factor associated with a storage system of the application. However, the scaling of the combination of data structures does not significantly affect the read/write latency involved in accessing the data when compared to using the data structures of the combination individually. A read/write latency involved in reading from or inserting a key-value pair into a single tree data structure that contains all the key-value pairs of the application is significant since the number of key-value pairs in the application can be significantly large. However, the technology minimizes the read/write latency involved in reading/inserting a key-value pair of a particular prefix from/into a particular tree data structure corresponding to the particular prefix since the particular tree data structure contains significantly lesser number of key-value pairs (e.g., as different tree data structures are used to store different subsets of key-value pairs of the application) compared to the single tree data structure that contains the entire key-value pairs of the application.

Similarly, the read/write latency associated with using a hash map, which does not provide sequential access, to store the key-value pairs of either a subset of the keys or entire keys is minimized by using the hash map to store the root nodes of the tree data structures storing corresponding subsets of the keys rather than the key-value pairs themselves. The hash map provides a quick way to identify a tree data structure that contains a particular subset of keys. After identifying the tree data structure, the key-value pairs can be obtained in a sequence from the tree data structure. The number of root nodes stored in the hash map, which corresponds to the number of subsets of keys, which corresponds to the number of distinct prefixes of the keys, is significantly less compared to the number of entries in the hash map that stores either a subset of key-value pairs or the entire key-value pairs of the application. Accordingly, the hash map can be scaled without significantly affecting the read/write latency associated with accessing the data stored in the hash map.

By using the hash map and the tree data structure in combination to access the key-value pairs of the application, the read/write latency involved associated with scaling of the data structures of the combination when used individually is minimized. Accordingly, the combination of the data structures can be used to provide sequential access to the data and can be scaled without significantly affecting the consumption of computing resources associated with accessing the data.

Environment

FIG. 1 is a block diagram illustrating an environment 100 in which the scalable data structures can be implemented for providing sequential access to data. The environment 100 includes a server 110 executing an application 155, e.g., a social networking application, that stores data items, e.g., related to users of the social networking application, in a storage system 125. In some embodiments, the storage system 125 can be a key-value storage system that stores the data items as key-value pairs. The scalable data structures 130 and 150 provide access to the data items, e.g., key-value pairs stored in tree data structure 135 which is stored in the storage system 125. Examples of data access operations are read, write, insert, modify, delete, etc.

The storage system 125 can store data associated with a client 105. A client 105 can be a user of the social networking application and can access the server 110 to perform various operations, including social networking operations, e.g., uploading a picture, posting a comment, etc. The client 105 can perform or cause the server 110 to perform data access operations on the data items stored at the storage system 125. The client 105, the server 110 and the storage system 125 may communicate with each other over various types of communication networks. For example, the client 105 may communicate with the server 110 over a communication network 160, e.g., Internet. The server 110 and a secondary storage 145 of the storage system 125 may communicate over a communication network 165, e.g., Internet, local area network (LAN), and a wide area network (WAN).

In some embodiments, the storage system 125 is an implementation of a LevelDB storage library (or other database) that stores data items as key-value pairs. The storage system 125 can include various storage layers, some of which can be in a primary storage 115 of the storage system 125 and others in the secondary storage 145 of the storage system 125. In some embodiments, the primary storage 115 can include random access memory (RAM) of the server 110. In some embodiments, the secondary storage 145 can include one or more of RAM (with power backup) based SSD, a flash-based SSD, a hybrid SSD, a hard disk drive, a magnetic tape, a compact disc, magnetic cassettes, or any other computer storage medium which can be used to persistently store the desired information.

The storage layer in the memory 115 can include data structures, e.g., "Memtable," "table_cache", "block_cache," "os_cache," etc. that can be used as a cache 120 to temporarily store at least a portion of the data items, e.g., using data structures 130 and 150, that are stored at the storage layers of the secondary storage 145. In some embodiments, the changes to the data structures 130 and 150 in the cache 120 are merged to the secondary storage 145 on occurrence of an event, e.g., when the cache 120 reaches a particular size, at a scheduled time, triggered by an action of a user, e.g., administrator of the storage system 125, etc. In some embodiments, larger the cache 120, larger is the amount of data items that can be stored in the cache 120, and lesser is the frequency with which the data items in the data structures 130 and 150 are written to the secondary storage 145.

The application 155 or the client 105 using the application 155 can require sequential access to the data items, e.g., key-value pairs, stored in the storage system 125. In some embodiments, the application 155 requires a sequential access to a particular subset of the key-value pairs rather than the entire key-value pairs stored in the storage system 125. For example, in the social networking application, the application is more likely to obtain a set of data items associated with a particular user sequentially more often than obtaining data items of all the users sequentially. In another example, a user of a restaurant finder application is more likely to request a list of restaurants that are in a particular city or a zip code in a sequence, e.g., in an increasing order of the distance of the restaurants from the user, rather than the across the entire state and/or country. The application 155 identifies various subsets of the data items that a user is likely to request a sequential access to and stores each of those subsets in a data structure that facilitates sequential access, e.g., tree data structure. Further, the application 155 can index those subsets based on a particular association or a relationship based on which the data items are grouped into a subset using an associative array data structure, e.g., hash map, that provides access to a subset based on a particular relationship.

For example, in the social networking application, the application 155 can group data items associated with different users into different subsets and store the subsets in different tree data structures. The application 155 can then index the subsets based on the user identification (ID) of the users. Similarly, in the restaurant finder application, the application 155 can group the restaurants in different cities in different subsets and store the subsets in different tree data structures. The application 155 can then index the subsets based on the city names.

In the environment 100, the data structure 150 can include a tree data structure 135 and the data structure 130 can include a hash map. In some embodiments, the data structure 150 is implemented as a B-tree tree data structure. The combination of data structures 130 and 150 provide a sequential access to the data items stored in the cache 120, e.g., data items stored in tree data structure 135. Further, the combination of data structures 130 and 150 are also scalable with the memory 115. Additional details with respect to providing sequential access to the data items are discussed in the following paragraphs at least in association with FIG. 2.

Figure 2A:
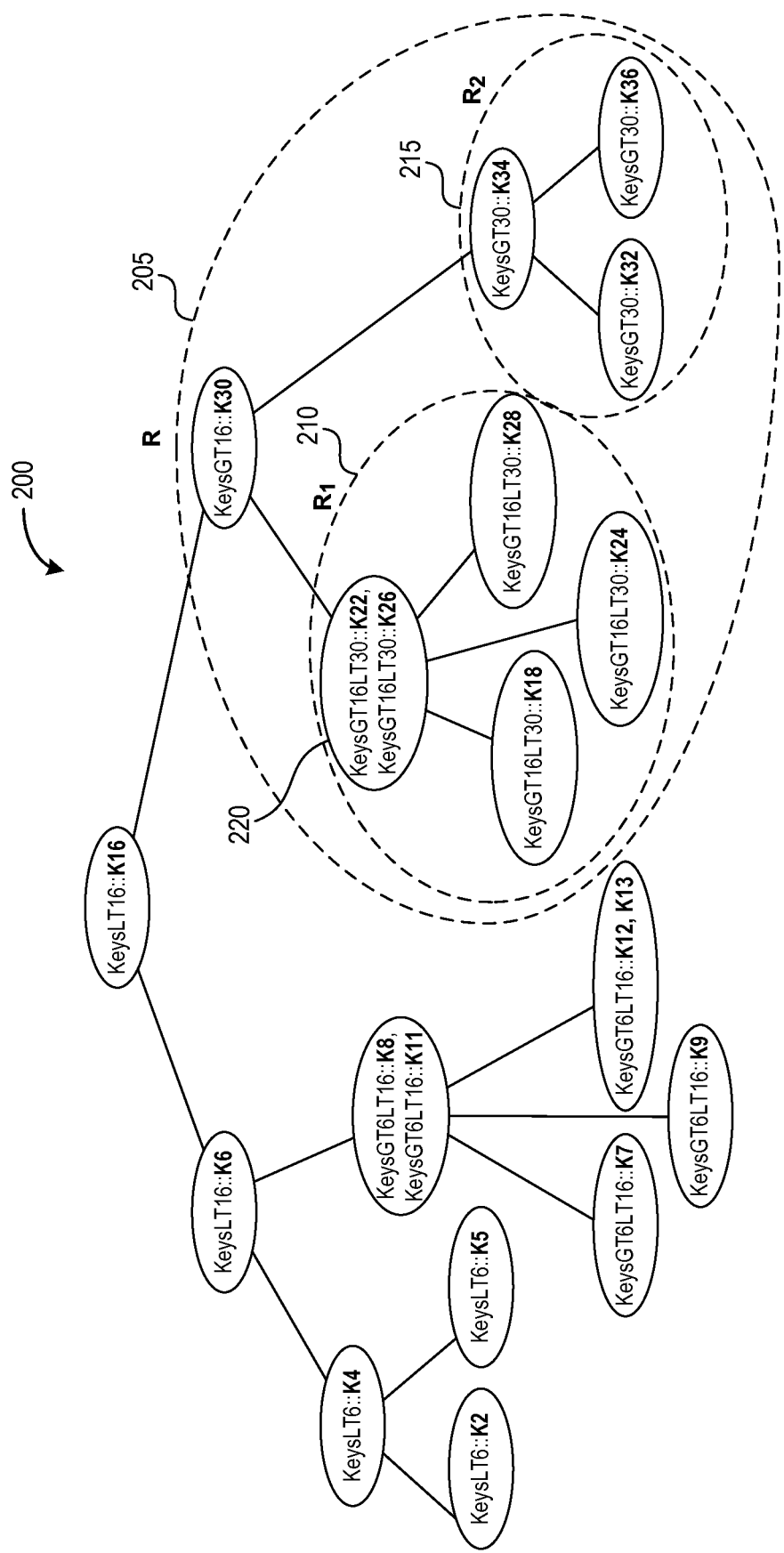
FIGS. 2A and 2B illustrate an example of scalable data structures that can be used for providing sequential access to data items.
Figure 2B:
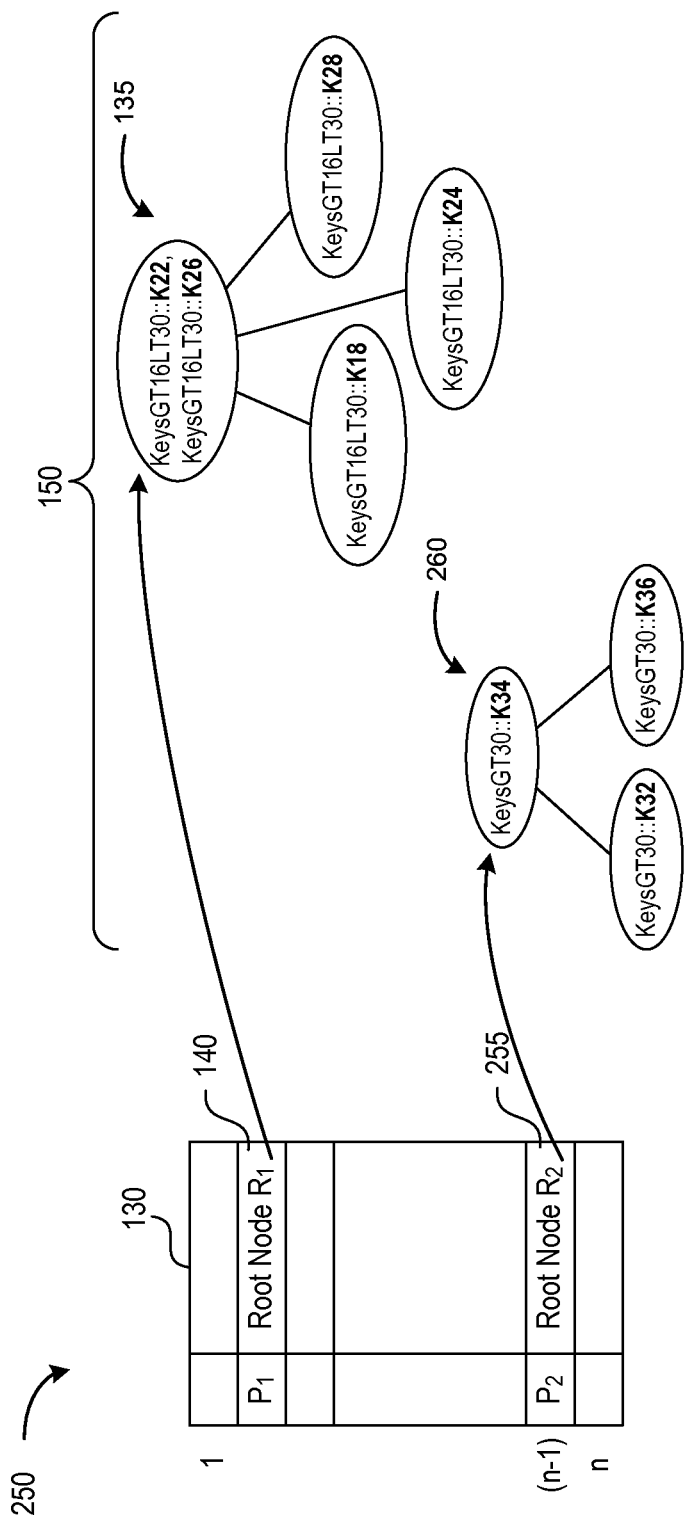

FIGS. 2A and 2B illustrate an example of scalable data structures that can be used for providing sequential access to data items. FIG. 2A illustrates a tree data structure 200 that stores data items, e.g., key-value pairs, associated with the application 155 in embodiments without scalable data structures 130 and 150. The tree data structure 200 can be a B-tree tree data structure. However, in some embodiments, the tree data structure 200 can be variations of B-tree tree data structures, or other convenient tree data structures that store and retrieve the keys of the key-value pairs in a particular order. In some embodiments, the application 155 generates a key in the format "<prefix>::<suffix>." In some embodiments, keys having a higher degree of relationship/associativity with each other can have the same prefix. The suffix is a portion of the key that is unique for each of the keys in the application 155. For example, in key "KeysLT16::K6," "KeysLT16" is the prefix of the key, and "K6" is the suffix of the key. The prefix "KeysLT16" indicates that the key "K6" belongs to a subset of keys that contains keys ranging from "K1" to "K15." Each of the keys in the tree data structure 200 uniquely identifies a data item of the application 155. The key stored in the tree data structure 200 can be of any data type, e.g., integer, string. A key can be of a user-configurable length, and the prefix can be a user-configurable portion of the key. It should be noted that the tree data structure 200 illustrate only the keys, but not the values of the keys, for convenience or simplicity of description. However, the values can be stored in association with the keys. The value associated with a key can be of any data type, e.g., integer, string, a user-defined data object.

Consider that the tree data structure 200 contains the entire set of the key-value pairs of the application 155. The tree data structure 200 stores the keys in a particular order—keys with a number lesser than number of a key at a node are stored towards the left of the node, and keys with a number greater than the number of the key at the node are stored towards the right of the node. For example, key "KeysLT16::K6" is lesser than key "K16" and hence it is stored as a child node towards left of the parent node ". . . K16," and key "KeysGT16::K30" is greater than key ". . . K16" and hence it is stored as a child node towards the right of the parent node ". . . K16" node. Some of the nodes in a B-tree can have more than one key, e.g., node 220 has keys "KeysGT16LT30::K22," and "KeysGT16LT30::K26." If a key is greater than one key of a parent node but less than another key of the parent node, the key is inserted as a child node in between the two keys, e.g., "KeysGT16LT30::K24" which is inserted as a child node between the keys "KeysGT16LT30::K22" and "KeysGT16LT30::K26" of the node 220.

The keys can be inserted into, deleted and retrieved from a B-tree using methods known to a person with ordinary skill in the art. In the tree data structure 200, the keys are sorted by comparing the numbering of the keys. However, different comparator functions can be used to sort the keys based on different criteria. A user, e.g., administrator of the storage system 125 or a developer of the application 155, can provide a customized comparator function that compares the keys based on a specific criterion and sorts the keys accordingly.

As the number of keys stored in the tree data structure 200 increases, managing the tree data structure 200 can consume significant computing resources, e.g., since inserting or removing a key in the tree data structure 200 can result in rewriting keys to different nodes of the tree data structure 200 to rearrange the tree data structure 200 accordingly. Further, retrieving a key can also consume significant computing resources since a number of nodes in the tree data structure 200 may have to be traversed to obtain a particular key (and its associated value). For example, to obtain values associated with the keys that are greater than ". . . K22," the application 155 has to traverse from node having key "K16"-> ". . . K30"->". . . K22" and then obtain the values associated with the keys ". . . K24," ". . . K26," and ". . . K28." That is, the application 155 may have to traverse three nodes and make three comparisons to obtain the values associated with the target keys, which is time consuming. As the number of key-value pairs stored in the tree data structure 200 increases, the latency involved in inserting or deleting a key increases significantly. Accordingly, the tree data structure 200 may not be scaled without adversely affecting the performance of the application 155.

The combination of hash map data structure 130 and the tree data structures 150 facilitates a sequential access to the key-value pairs, e.g., key-value pairs stored in the tree data structure 200, while still being scalable. Note that in the tree data structure 200, the keys that have a higher degree of relationship are closer to each other. For example, keys in the first subset 205 are related to each other with a higher degree of relationship (e.g., all are above 16 and hence prefix "KeysGT16") than to other keys in the tree data structure 200. Similarly keys "K18," "K22," "K24," "K26," and "K28" within the second subset 210 are related to each other with a higher degree of relationship (e.g., all are between 16 and 30) than to other keys in the first subset 205. Similarly, the keys "K34," "K32" and "K36" within the third subset 215 are related to each other with a higher degree of relationship (e.g., all are above 30) than to other keys in the first subset 205.

The application 155 can store a subset of the key-value pairs, e.g., the keys that have a higher degree of relationship/ associativity with each other, that is, keys with the same prefix, in a tree data structure and index the subset based on the prefix of the keys in the subset. For example, the application 155 can store subsets 210 and 215 in two separate tree data structures 135 and 260, respectively, and index the root nodes 140 and 255 of the tree data structures 135 and 260 in a hash map 130, e.g., by using a prefix of the keys in the corresponding subsets for indexing. For example, the hash key for indexing the tree data structure 135 corresponding to the second subset 210 can include the prefix "KeysGT16LT30." Similarly, the hash key for indexing the tree data structure 260 corresponding to the third subset 215 can include the prefix "KeysGT30." The application 155 can use the prefix "KeysGT16LT30" to store or retrieve the root node 140 of the tree data structure 135 from the hash map 130. The root node 140 includes a pointer or a reference to the node 220 of the tree data structure 135.

When the application 155 receives a query for retrieving the keys, "KeysGT16LT30::K18," "KeysGT16LT30::K22," ". . . ::K24," ". . . ::K26," and ". . . ::K28," the application 155 extracts the prefix of the keys "KeysGT16LT30" from the query and performs a lookup in the hash map 130 using the prefix to retrieve the root node 140 of the tree data structure 135 corresponding to the prefix "KeysGT16LT30." After obtaining the root node 140 of the tree data structure 135, the application 155 traverses the tree data structure 135 to retrieve the keys and their corresponding values in a sequence. By using the combination of data structures 130 and 135, the amount of time that would have otherwise been consumed in traversing the tree data structure 200 to retrieve the keys of the second subset 210 is minimized. For example, the comparisons at nodes having keys "K16" and "...K30" are eliminated by using the combination of data structures 130 and 135 for retrieving the keys of the second subset 210.

The combination of data structures 130 and 135 can also be used in a social networking application. In the social networking application, the keys for the data items that are often sequentially accessed are generated with a same prefix. For example, if the data items are accessed sequentially for a particular user, then the application 155 can generate the keys with a user ID of a user as a prefix of the keys. The key can be of the format "<user_ID>::<suffix>." Consider that the social networking application includes a first user with user ID "John" and a second user with user ID "Jane." Then the keys of the data items for John can be of the form "John::<suffix>" and "Jane::<suffix>" for Jane. The application 155 can generate separate tree data structures, e.g., tree data structures 135 and 260, for the users John and Jane, and index these tree data structures in the hash map 130 using the prefixes "John" and "Jane." The prefix of the keys can be generated based on various criteria. For example, if the data items are sequentially accessed for users in a particular country, the keys can be of the form "<country>::<suffix>."

The data structures 130 and 150 can be scaled to manage larger amount of data items without significantly affecting the read/write latency involved in accessing the data items when compared to using the data structures of the combination individually. A read/write latency involved in reading from or inserting a key-value pair into a single tree data structure 200 that contains all the key-value pairs of the application 155 can be significant since the number of key-value pairs in the application 155 can be significantly large. As shown in the example 250 of FIG. 2B, different tree data structures, e.g., tree data structures 135 and 260, are used to store different subsets of key-value pairs of the application 155. Accordingly, a particular tree data structure in the combination of data structures 130 and 150 contains significantly lesser number of key-value pairs compared to the single tree data structure 200 and can be scaled without significantly affecting the read/write latency. Similarly, the hash map 130 which can have as many entries as the number of tree data structures can also be scaled without significantly affecting the read/write latency.

Figure 3:
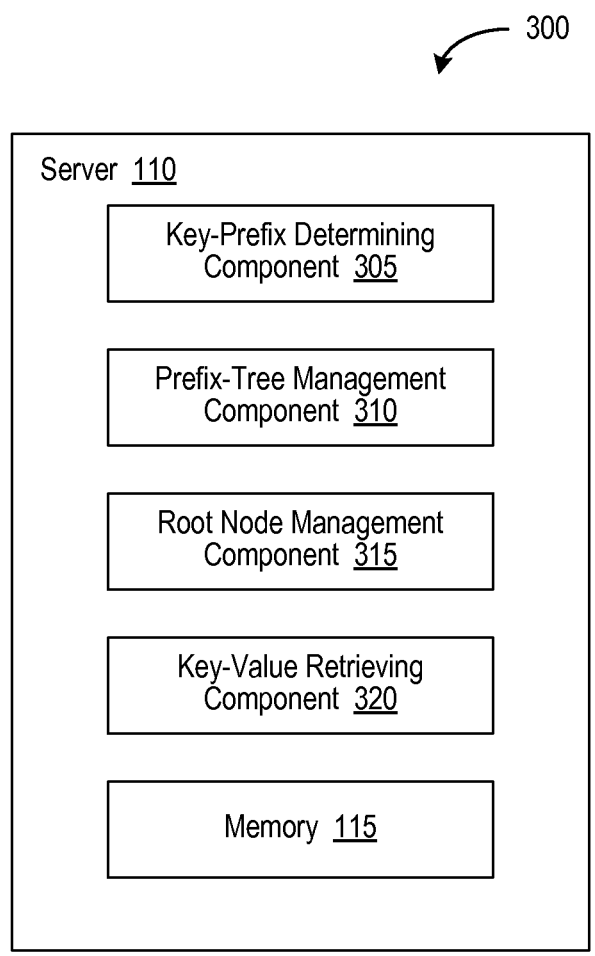
FIG. 3 is a block diagram of a server for implementing the scalable data structures for providing a sequential access to data items (also referred to as "key-value pairs") in an application.

FIG. 3 is a block diagram of the server 110 for implementing the scalable data structures for providing a sequential access to data items in the application 155. The server 110 includes a key-prefix determining component 305 to determine the prefixes of keys in the application 155. The application 155 stores the data items associated with the application 155 as key-value pairs in the storage system 125. The application 155 generates keys for each of the data items. A key can be generated as a combination of a prefix and a suffix. While the suffixes of the keys are distinct, the prefix of some of the keys can be the same. In some embodiments, the keys having a higher degree of relationship/associativity with each other can have the same prefix. The key-prefix determining component 305 identifies different subsets of keys having the same prefix.

A prefix-tree management component 310 generates a tree data structure for each of the identified subsets of keys. In generating a tree data structure, the prefix-tree management component 310 stores the keys of an identified subset as a set of child nodes of a root node of the tree data structure in a particular sequence. Each tree data structure corresponds to a particular subset of keys with a particular prefix. The root node of the tree data structure can store identifying information about the tree data structure, e.g., metadata of the tree data structure, and a pointer or reference to the child nodes. In some embodiments, the tree data structure is a B-tree tree data structure. In some embodiments, the tree data structure is stored in the memory 115 of the server 110.

A root node management component 315 stores the root nodes of the tree data structures in a first data structure, and indexes the root nodes using the prefixes to which the tree data structures correspond. In some embodiments, the first data structure can be an associative array data structure, e.g., a hash map 130, that stores data as key-value pairs. In some embodiments, the hash map 130 is stored in the memory 115 of the server 110. The root node management component 315 stores a particular prefix and a root node of a tree data structure which corresponds to the subset of the keys with the particular prefix as a key-value pair in the hash map 130. The tree data structures and the hash map 130 form a combined data structure that stores the key-value pairs of the application 155.

A key-value retrieving component 320 facilitates retrieving values of a particular set of keys from the storage system 125 using the combined data structure. Upon receiving a query for retrieving a value associated with an input key, the key-value retrieving component 320 determines a prefix of the input key and obtains a root node of a tree data structure that contains the keys having the determined prefix. The key-value retrieving component 320 obtains the root node by performing a lookup in the hash map 130 using the prefix of the input key. After obtaining the root node, the key-value retrieving component 320 identifies a key in the set of child nodes of the tree data structure that matches with the input key and retrieves the associated value.

Figure 4:
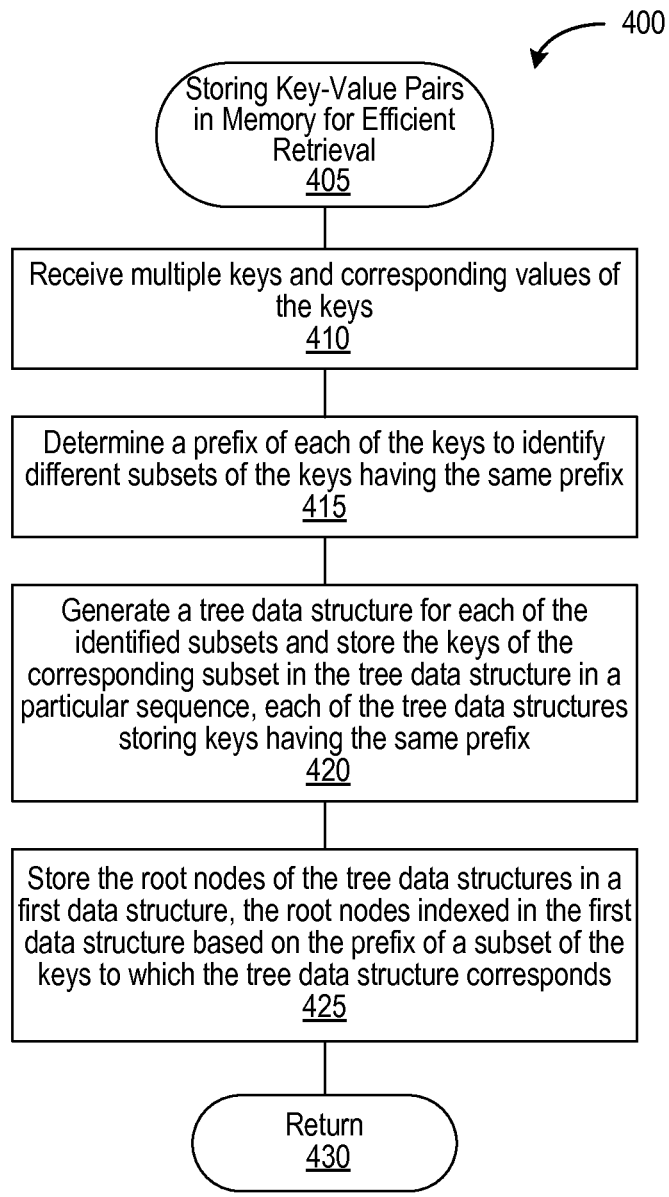
FIG. 4 is a flow diagram of a process for storing the key-value pairs in a storage system associated with the server using the scalable data structures.

FIG. 4 is a flow diagram of a process 400 for storing key-value pairs in a storage system 125 of the server 110 using the scalable data structures. The process 400 may be executed in a system such as system 300 of FIG. 3 and can be used in an environment 100 of FIG. 1. The process 400 begins at block 405, and at block 410, the key-prefix determining component 305 receives a set of keys, e.g., the keys depicted in FIG. 2B, and corresponding values of the keys for storage at the storage system 125. In some embodiments, a key can be a combination of a prefix and a suffix. While the suffixes of the keys are distinct, the prefix of some of the keys can be the same. In some embodiments, the keys having a higher degree of relationship/associativity with each other can have the same prefix.

At block 415, the key-prefix determining component 305 determines a prefix of each of the set of keys to obtain different subsets of keys having the same prefix. For example, the prefix of the keys of FIG. 2B include "KeysGT16LT30" and "KeysGT30."

At block 420, the prefix-tree management component 310 generates a tree data structure for storing each of the identified subset of keys, for example, trees 135 and 260 of FIG. 2. The prefix-tree management component 310 stores the keys of an identified subset as a set of child nodes of a root node of the tree data structure in a particular sequence. Each tree data structure corresponds to a particular subset of keys with a particular prefix. For example, tree 135 of FIG. 2B corresponds to keys with prefix "KeysGT16LT30" and tree 260 corresponds to keys with prefix "KeysGT30." The root node of the tree data structure can store identifying information about the tree data structure, e.g., metadata of the tree data structure, and a pointer or reference to the child nodes. In some embodiments, the tree data structure is a B-tree tree data structure.

At block 425, the root node management component 315 stores the root nodes in a first data structure and indexes the root nodes using the prefixes of the identified subsets of the keys to which the tree data structures correspond, and the process 400 returns. In some embodiments, the first data structure can be an associative array data structure, e.g., a hash map 130, that stores data as key-value pairs. The root node management component 315 stores a particular prefix and a root node of a tree data structure which corresponds to the subset of the keys with the particular prefix as a key-value pair in the hash map 130. For example, the hash map 130 stores the root node of tree 135 at a particular index determined based on the prefix "KeysGT16LT30" and the root node of tree 260 at another index determined based on the prefix "KeysGT30."

Figure 5:
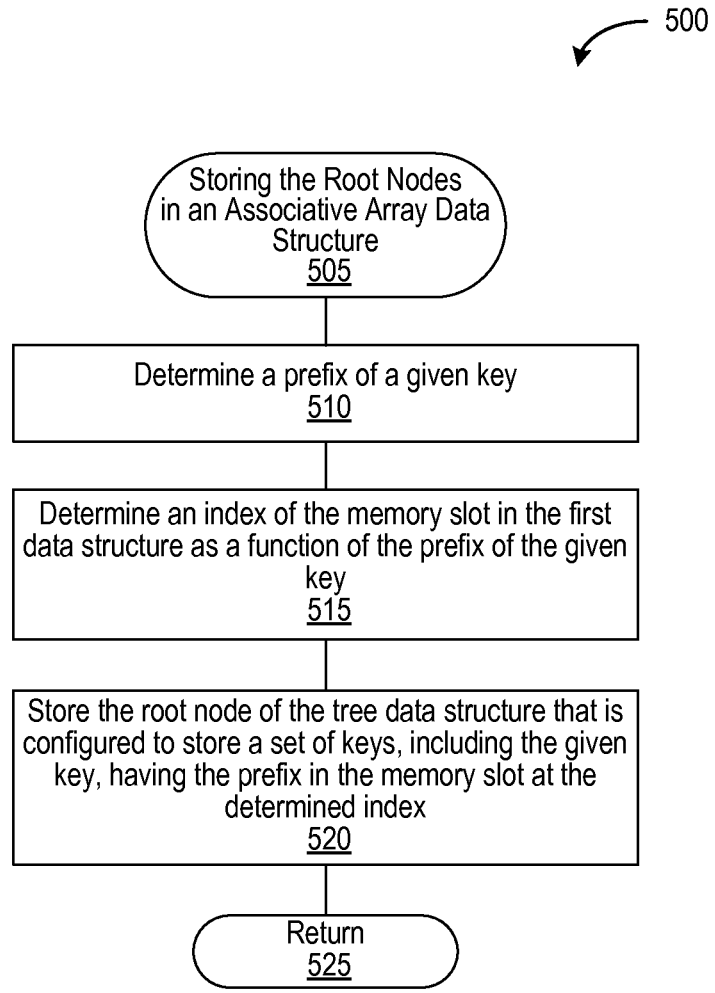
FIG. 5 is a flow diagram of a process for storing a root node of a tree data structure in an associative array data structure.

FIG. 5 is a flow diagram of a process 500 for storing a root node of a tree data structure in an associative array data structure. The process 500 may be executed by server 110 and in an environment 100 of FIG. 1. In some embodiments, the process 500 can be used to implement the block 425 of process 400. In some embodiments, the associative array data structure can be implemented using a hash map data structure. The hash map data structure includes an array of entries ("buckets") that can store values of corresponding keys. The hash map uses a hash function on a key of a key-value pair that determines an index of the bucket, from which the corresponding value can be found.

The process 500 beings at block 505, and at block 510, the key-prefix determining component 305 determines a prefix of a particular key of an application 155. For example, consider that a root node of a tree storing the key "KeysGT30::K32" is being stored in the hash map 130. The key-prefix determining component 305 determines a prefix of the key "KeysGT30::K32" as "KeysGT30."

At block 515, the root node management component 315 determines an index of the bucket at which a root node of a tree data structure is to be stored based on the prefix of the particular key. For example, the root node management component 315 determines an index of the hash map 130 for storing the root node of tree 260 based on the prefix "KeysGT30." The hash map 130 uses a hash function on the prefix to determine the index of the bucket at which the root node of the tree data structure corresponding to the prefix can be stored, and returns the index to the root node management component 315.

At block 520, the root node management component 315 stores the root node of the tree data structure in the bucket at the determined index, and the process 500 returns. For example, the root node management component 315 stores the root node of tree 260 at the index determined based on the prefix "KeysGT30." In some embodiments, the root node management component 315 also stores the prefix in the hash map 130. For example, the root node management component 315 stores the prefix "KeysGT30" indicated as "P1" in the hash map 130.

Figure 6:
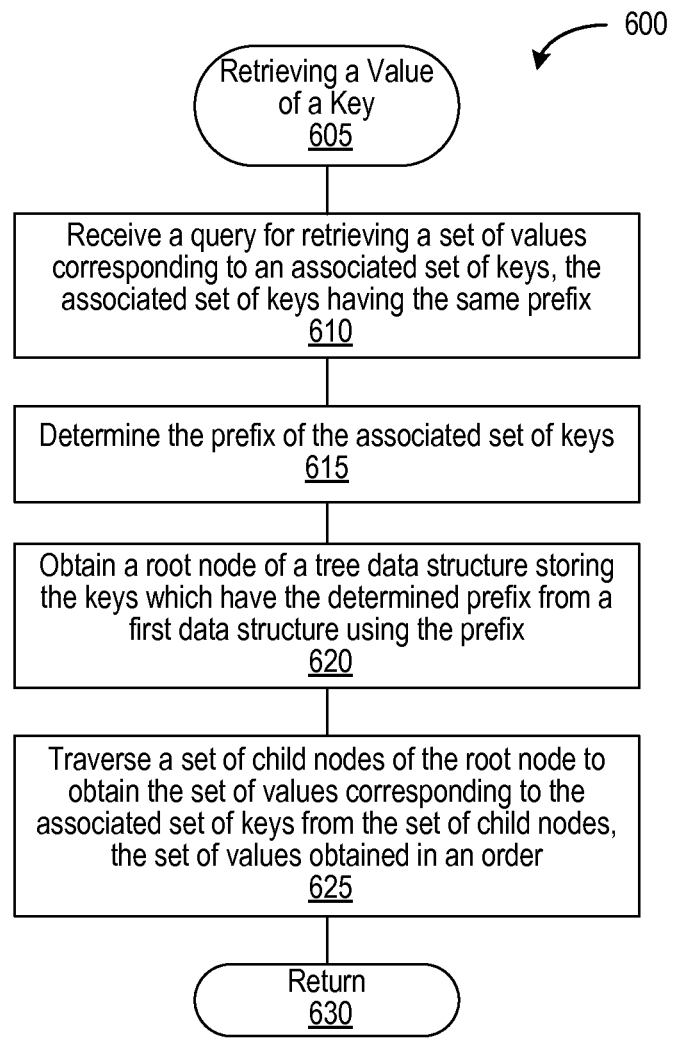
FIG. 6 is a flow diagram of a process for retrieving an ordered set of key-value pairs using the scalable data structure.

FIG. 6 is a flow diagram of a process 600 for retrieving an ordered set of data items (key-value pairs) using a scalable data structure. The process 600 may be executed by server 110 and in environment 100 of FIG. 1. The process 600 beings at block 605, and at block 610, the key-value retrieving component 320 receives a query from an application for retrieving a set of values corresponding to a set of associated keys. For example, the query can be for retrieving values associated with key "KeysGT30::K32." In some embodiments, a key can be a combination of a prefix and a suffix. While the suffixes of the keys are distinct, the prefix of some of the keys can be the same. In some embodiments, the keys having a higher degree of relationship/associativity with each other can have the same prefix. In some embodiments, the associated set of keys have a high-degree of relationship/associativity with each other, and therefore have the same prefix.

In some embodiments, the application can be a social networking application and the set of associated key-value pairs can represent a set of data associated with a particular user of one or more users of the social networking application.

At block 615, the key-value retrieving component 320 and/or the key-prefix determining component 305 determines the prefix of the associated set of keys. For example, the key-value retrieving component 320 and/or the key-prefix determining component 305 determines the prefix of the key "KeysGT30::K32" as "KeysGT30."

At block 620, the key-value retrieving component 320 and/or the root node management component 315 obtains a root node of a tree data structure storing the keys having the determined prefix from a first data structure, e.g., a hash map, using the prefix. In some embodiments, the key-value retrieving component 320 and/or the root node management component 315 performs a lookup in the hash map 130 using the prefix to obtain the root node. For example, the key-value retrieving component 320 and/or the root node management component 315 obtains the root node of the tree data structure 260 storing the key "KeysGT30::K32" using the key's prefix "KeysGT30" to perform a lookup in the hashmap 130.

At block 625, the key-value retrieving component 320 traverses the tree data structure to identify the keys in the set of child nodes that match with the associated set of keys, and retrieves the corresponding values of the associated set of keys from the set of child nodes in an order. For example, after obtaining the root node of the tree 260, the key-value retrieving component 320 traverses the tree 260 to the node containing the key "KeysGT30::K32" and then obtains the associated values in a particular order. The process 600 returns at block 630.

FIG. 7 is a block diagram of a computer system as may be used to implement features of some embodiments of the disclosed technology. The computing system 700 may be used to implement any of the entities, components or services depicted in the examples of FIGS. 1-5 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    receiving multiple keys and corresponding values for the keys, each of the keys being a combination of a prefix and a suffix;
    generating multiple tree data structures, wherein the multiple tree data structures include a tree data structure for storing a subset of the keys having a first prefix of distinct prefixes of the keys, wherein all keys in the tree data structure share the first prefix, and wherein each of the multiple tree data structures stores keys that share a specified prefix of the distinct prefixes; and
    storing, in a first data structure having multiple root nodes of the multiple tree data structures, a root node of the tree data structure wherein the root node is indexed in the first data structure based on the first prefix, wherein each of the root nodes is indexed based on a specified prefix shared by keys stored in the corresponding tree data structure, the storing including storing the subset of the keys as child nodes of the root node in the tree data structure, the child nodes stored in a specified order.

2. The method of claim 1, wherein the first prefix of the subset of the keys indicate an association between the keys of the subset.

3. The method of claim 1, wherein the keys having the first prefix have an higher degree of association with each other than the keys having different prefixes.

4. The method of claim 1, wherein storing the subset of the keys in the tree data structure as child nodes includes storing the corresponding values of the subset of the keys in the child nodes.

5. The method of claim 1, wherein the first data structure is an associative array data structure, and wherein the tree data structure is a B-tree tree data structure.

6. The method of claim 1, wherein the order of the child nodes is determined based on the keys of the subset.

7. The method of claim 6, wherein the order of the child nodes is determined by comparing the keys of the subset, the comparing performed using a user-configurable comparator method.

8. The method of claim 1, wherein the keys represent multiple attributes of a user of a social networking application executing at the computing system, and wherein the corresponding values of the keys represent corresponding attribute values.

9. The method of claim 1 further comprising:
    receiving a request for retrieving a first value corresponding to an input key;
    determining a specified prefix of the input key;

obtaining, from the first data structure, a first root node of a first tree data structure of the tree data structures corresponding to the specified prefix; and traversing a set of child nodes of the first tree data structure to obtain the first value corresponding to the input key.

10. The method of claim 9, wherein obtaining the first root node from the first data structure includes:

obtaining a first index that contains the first root node based on the specified prefix, and retrieving the first root node from the first data structure.

11. The method of claim 9, wherein traversing a set of child nodes of the first tree data structure includes:

comparing the input key with a first set of the keys corresponding to the set of child nodes, identifying a target key of the first set of the keys matching with the input key, and obtaining the first value corresponding to the target key.

12. A computer-readable storage device storing computer-readable instructions, comprising:

instructions for receiving a query for retrieving a set of values corresponding to an associated set of keys from a storage system of a computing system, the storage system storing multiple keys and corresponding values for the keys, each of the keys being a combination of a prefix and a suffix, the keys having distinct suffixes, multiple subsets of the keys having distinct prefixes, the keys in a first subset of the subsets having a first prefix of the distinct prefixes, the associated set of keys having a given prefix;

instructions for determining the given prefix of the associated set of keys;

instructions for obtaining, from a first data structure in the storage system, a root node of a tree data structure corresponding to the given prefix, the first data structure storing multiple root nodes of multiple tree data structures corresponding to the distinct prefixes, each of the tree data structures storing a corresponding subset of the subsets of the keys having a corresponding prefix of the distinct prefixes as child nodes of the corresponding root node, wherein the root node of the tree data structure is indexed in the first data structure based on the given prefix, wherein all keys in the tree data structure share the given prefix; and instructions for traversing a set of child nodes of the tree data structure to obtain the set of values corresponding to the associated set of keys.

13. The computer-readable storage device of claim 12, wherein the first data structure is an associate array data structure.

14. The computer-readable storage device of claim 12, wherein the tree data structure is a B-tree tree data structure.

15. The computer-readable storage device of claim 12, wherein the first data structure has an array of multiple entries, and wherein the instructions for obtaining the root node from the first data structure include:

instructions for determining an index of an entry of the entries in which the root node of the tree data structure corresponding to given prefix is stored, the index determined as a function of the given prefix.

16. The computer-readable storage device of claim 12, wherein instructions for traversing a set of child nodes of the tree data structure includes:

comparing each of the associated set of keys with a first set of the keys corresponding to the set of child nodes, identifying a subset of the first set of the keys matching with the associated set of keys, and obtaining the set of values corresponding to the subset of the first set of the keys.

17. The computer-readable storage device of claim 12, wherein the set of values is an ordered set, and wherein an order of the set of values correspond to the order of the set of child nodes.

18. A system, comprising:

a processor;

a key-prefix determining component, in cooperation with the processor, to determine multiple prefixes of multiple keys, the keys having corresponding values, each of the keys being a combination of a prefix and a suffix, the keys having distinct suffixes;

a root node management component configured to store multiple root nodes of multiple tree data structures corresponding to distinct prefixes of the keys in a first data structure, wherein the multiple tree data structures include a tree data structure to store keys sharing a first prefix of the distinct prefixes, wherein all keys in the tree data structure share the first prefix, wherein the first root node is indexed in the first data structure based on the first prefix; and a prefix-tree management component configured to store, for the tree data structure the keys having the first prefix as a set of child nodes of a root node of the tree data structure, the set of child nodes stored in an order based on the corresponding subset of the keys.

19. The system of claim 18 further comprising:

a key-value retrieving component configured to retrieve a first value corresponding to an input key from the storage system, the retrieving including:

determining a first prefix of the input key, obtaining, from the first data structure, a specified root node of a specified tree data structure of the tree data structures corresponding to the first prefix, and traversing a set of child nodes of the specified tree data structure to obtain the first value corresponding to the input key.

* * * * *